April 28, 1953     J. W. PICKING     2,636,692

CONTROL SYSTEM

Filed March 26, 1945

INVENTOR.
Jay W. Picking
BY Shoeling and Krost
attys.

Patented Apr. 28, 1953

2,636,692

UNITED STATES PATENT OFFICE 2,636,692

CONTROL SYSTEM

Jay W. Picking, Cleveland, Ohio, assignor to The Reliance Electric & Engineering Company, a corporation of Ohio Application March 26, 1945, Serial No. 584,986

14 Claims. (Cl. 242—76)

My invention relates in general to a control system, and more particularly to a control system for regulating the path of moving material.

An object of my invention is the provision of a control system which is responsive to the path of moving material and which through suitable mechanism regulates the path of the moving material to compensate for variations in uneven or irregular movements in the travel of the material.

Another object of my invention is to the provision of a variable inductance element which is responsive to the path of the moving material and which varies a phase shift circuit for controlling the output of a grid controlled rectifier circuit whereby the grid controlled rectifier circuit may in turn regulate through suitable mechanism the path of the moving material to compensate for variations in uneven or irregular movements in the travel of the material.

Another object of my invention is the provision of at least two variable inductances controlled by the path of moving material, the said inductances being adaptable for utilization in a bridge phase shift circuit for shifting the phase of a grid controlled rectifier circuit.

Another object of my invention is the provision of laterally shifting the travel of moving material through means of a control system responsive to the travel of the moving material whereby the moving material may be fed or guided into a processing machine under predetermined controlled conditions.

Figure 1:
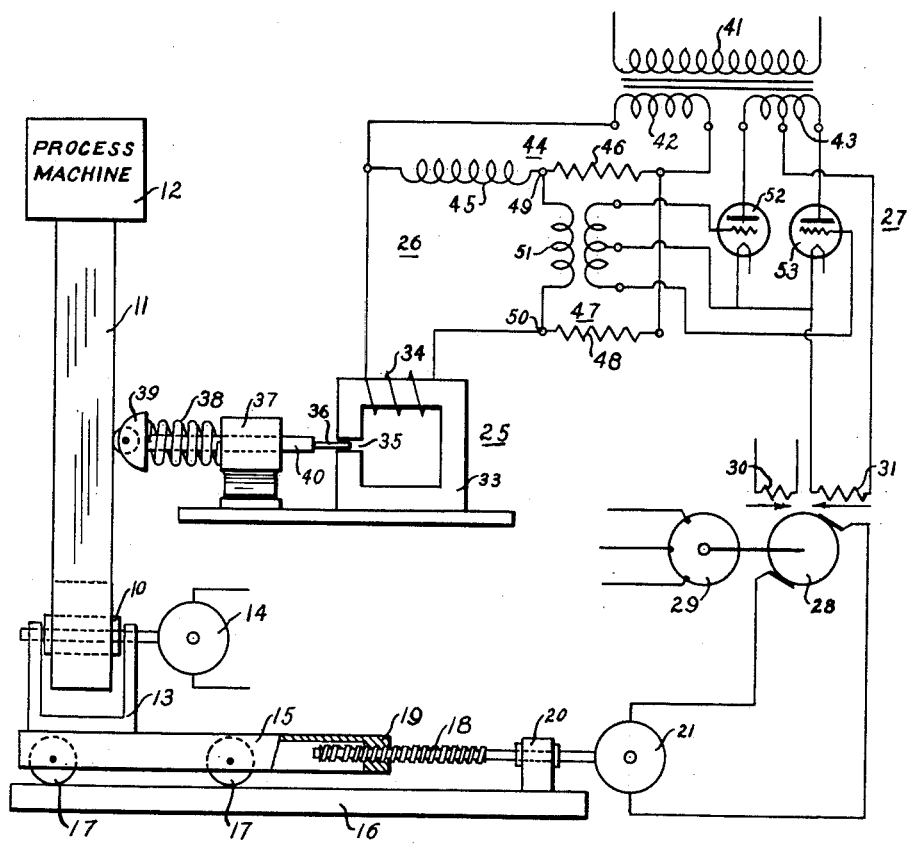
Figure 2:
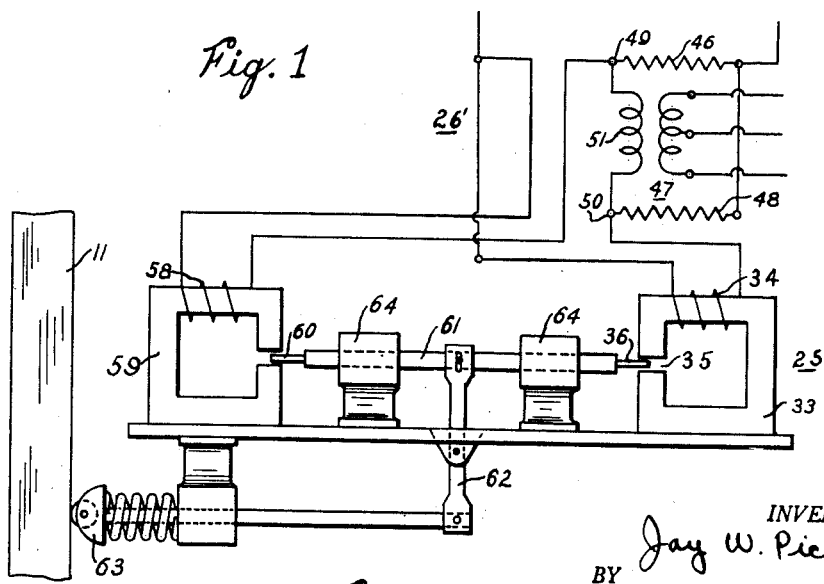

Other objects and a fuller understanding of my invention may be had by referring to the following description and claims, taken in conjunction with the accompanying drawing, in which:

Figure 1 is a diagrammatic illustration of a control system embodying the features of my invention; and Figure 2 shows a modified arrangement of the variable inductances which may be employed in the control system of Figure 1.

With reference to Figure 1 of the drawing, my control system is adapted to regulate the path of the moving material 11 as it passes from a supply reel 10 to a processing machine 12. In my invention, the moving material 11 is regulated to travel to the processing machine under a predetermined controlled condition. Any uneven or irregular movements of the moving material are corrected through the adaptation of my control system before the moving material enters the processing machine. Any suitable means may be employed to regulate the path of the moving material to correct for uneven or irregular movement, and as illustrated I diagrammatically show a shiftable base or table 15 upon which the supply reel 10 may be mounted by a suitable reel support 13. In the event that the uneven or irregular movement of the travelling material is to the right of a predetermined center line of travel of the material, then the reel support 13 is shifted to the left under the action of my control system to compensate for the irregularity in the movement of the material. The shifting of the supply reel 10 either to the right or the left to correct for uneven or irregular movement in the travel of the material may be accomplished in any suitable manner, and as diagrammatically illustrated I mount the shiftable base or table 15 upon guide wheels 17 which run or move upon guide rails 16. The shiftable base or table 15 may be laterally shifted by means of a traversing screw 18 which is driven by a reversing motor 21. The traversing screw is mounted in a support 20 which restrains the screw from endwise movement as it is rotated by the reversing motor 21. The right-hand end of the shiftable base or table 15 may be provided with a down-turned flange having a threaded opening 19 in which the traversing screw 18 operates. Rotation of the reversing motor 21 in one direction causes the traversing screw 18 to move the shiftable base or table 15 to the right and rotation of the reversing motor 21 in the opposite direction causes the traversing screw 18 to move the shiftable base or table 15 to the left. The supply reel 10 may be drive by any suitable power means such, for example, as by a driving motor 14 which is diagrammatically illustrated but which in actual installation is carried by the shiftable base or table 15 so that the driving motor 14 moves as a unit with the supply reel 10.

The direction of rotation of the reversing motor 21 is governed by my control circuit which is responsive to the travel of the moving material 11. My control circuit comprises generally a variable inductance 25, a phase shift circuit 26 controlled thereby, and a grid controlled rectifier circuit 27 governed by the phase shift circuit 26. The power output of the grid controlled rectifier circuit 27 is arranged to excite a field winding 31 of a generator 28 which supplies energy for driving the reversing motor 21. The generator 28 also has a separately excited field winding 30 which may be suitably excited by any separate source. The two field windings 30 and 31 are energized in opposite polarity so that they oppose each other. When the power output of the grid controlled rectifier circuit 27 is in the neighborhood of 50%, the field winding 31 neutralizes the effect of the field winding 30 so that the generator under this condition generates no voltage in which case the reversing motor 21 is arrested. In other words, when the field winding 31 is fully excited it has substantially twice the number of ampere turns as the field winding 30. When the field winding 31 is completely de-energized the generator 28 generates a voltage of a polarity which provides for driving the reversing motor 21 in one direction at its maximum speed. When the field winding 31 is fully excited by the grid controlled rectifier circuit 27, the generator generates a voltage of the opposite polarity for operating the reversing motor 21 in the reverse direction at its maximum speed. Accordingly, by varying the excitation of the field winding 31 from zero to its full value, the reversing motor 21 is caused to change from a condition of maximum speed in one direction to a maximum speed in the opposite direction. The generator 28 may be driven by any suitable means such, for example, as by a motor 29.

The variable inductance 25 comprises generally a magnetizable core 33, a winding 34 mounted thereon, and a vane or tongue 36 mounted in an air gap 35 of the magnetizable core. The vane or tongue 36 is adapted to move in the air gap 35 to vary the inductance of the variable inductance 25. As illustrated, the vane or tongue 36 is carried by a guide member 40 which is slidably mounted in a guide support 37. The left-hand end of the guide member 40 is provided with an edge contacting device 39 which is responsive to uneven or irregular movements in the travel of the material 11. A spring 38 which surrounds the guide member 40 is arranged to keep the edge contacting device 39 in contact with the moving material. Accordingly, uneven or irregular movement in the travel of the material causes the vane or tongue 36 to move in the air gap 35 to vary the reactance of the inductance 25.

The winding 34 of the inductance 25 is connected in my phase shift circuit 26 and constitutes a part thereof. The phase shift circuit 26 is of the type shown in my patent application filed on even date herewith, entitled Phase Shift Circuit, and assigned to the present assignee, said phase shift circuit application being filed March 26, 1945, and bearing Serial No. 584,987, now abandoned. My phase shift circuit 26 comprises generally a first bridge circuit 44 and a second bridge circuit 47 energized by a secondary winding 42 from the transformer 41. The first bridge circuit 44 comprises an inductance element 45 and a resistance element 46. The second bridge circuit 47 comprises the windings 34 of the variable inductance 25 and a resistance element 48. The first bridge circuit 44 is provided with an output connection 49 and the second bridge circuit 47 is provided with an output connection 50. A grid transformer 51 is connected between the output connections 49 and 50 and is arranged to control the phase shift upon the grids of the rectifier tubes 52 and 53 of the grid controlled rectifier circuit 27. The plate circuits for the grid controlled rectifier tubes 52 and 53 are supplied with energy from a secondary winding 43 of the transformer 41. The internal resistance of the inductance element 45 is different from the internal resistance of the winding 34 of the inductance 25 whereby the locus of the voltage at the output connection 49 is spaced from the locus of the voltage at the output connection 50. Under this condition, I am able to obtain a continuous shifting in phase through the variable inductance 25 from a single source of voltage exciting the phase shift circuit. In actual practice, the winding for the inductance element 45 and the winding 34 for the variable inductance 25 may have the same number of turns but of a different size wire. In the phase shift circuit illustrated I am able to get a relatively large change in the voltage phase shift across the output connections 49 and 50 for a relatively small phase shift in the voltage in the winding 34 of the variable inductance 25. Accordingly, my control system is responsive to the slightest amount of uneven or irregular movement of the travel of the material 11. The vane or tongue 36 is of magnetic material and as it moves in and out of the air gap 35 the amount of flux which passes through the air gap 35 is varied. The irregular or uneven movement of the edge of the moving material 11 may be in the order of a few thousandths of an inch and because of the requirement to compensate for this small movement I find that my control system is particularly adaptable for correcting this condition. This is true because a small change in the phase angle of the voltage in the winding 34 produces a relatively large shift in the phase angle of the voltage across the output connections 49 and 50 which controls the grid controlled rectifier tubes 52 and 53. Because of the multiplying action of the phase shift circuit, the reversing motor 21 is made very sensitive to small movements in the irregularity of the travel of the material 11.

In Figure 2 I show a modified form of the phase shift circuit in that I employ an extra variable inductance 58 which takes the place of the inductance element 45 in the phase shift circuit. The magnetizable core 59 of the variable inductance 58 is provided with an air gap in which a vane or tongue 60 moves to vary the reactance thereof. The vane or tongue 60 for the variable inductance 58 and the vane or tongue 36 for the variable inductance 25 may be actuated by a common guide member 61 slidably mounted within supports 64. The common guide member 61 may be actuated by an actuating lever 62 which is moved in response to an edge contacting device 63 that contacts the edge of the moving material 11. With two variable inductances in my phase shift circuit I am able to obtain still more delicate control in response to small irregular or uneven movements of the moving material 11.

In this invention I have shown my control system as being responsive to the edge of a moving material whereby a reel may guide the moving material to a processing machine under predetermined controlled conditions. My invention may be applied to any other situation such, for example, as the inductance of the variable inductance may be controlled by a dancer roll riding upon moving material passing between spaced rollers, whereby my control system would function to keep the loop or sag of the material between the spaced rollers under a uniform condition. Because of the high sensitivity of my control system, it is applicable to many conditions for correcting small changes in the movement of the material being controlled.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A control system for regulating the path of moving material, said system comprising mechanism in cooperation with said material for varying the path of said material, movable means responsive to the path of said material, variable inductance means including a magnetic core having an air gap, a movable member actuated by said movable means and adapted to move in said air gap to vary the reactance of the variable inductance means, a generator having first and second field windings, means for energizing said first field winding of one polarity, a grid controlled rectifier tube for energizing said second field winding of an opposite polarity to that of the first field winding, said second field winding being energizable to have a stronger field strength than said first field winding, a phase shift circuit including said variable inductance means for operating said tube and vary the output thereof and the field strength of said second field winding, and a motor energized by said generator for driving the mechanism to vary the path of said material.

2. A control system for regulating the path of moving material, said system comprising mechanism in cooperation with said material for varying the path of said material, movable means responsive to the path of said material, variable inductance means including a magnetic core having an air gap, a movable member actuated by said movable means and adapted to move in said air gap to vary the reactance of the variable inductance means, a generator having first and second field windings, means for energizing said first field winding of one polarity, a grid controlled rectifier tube for energizing said second field winding of an opposite polarity to that of the first field winding, a phase shift circuit including said variable inductance means for operating the grid of the tube and vary the output thereof and the field strength of said second field winding, and a motor energized by said generator for driving the mechanism to vary the path of said material.

3. A control system for regulating the path of moving material, said system comprising mechanism in cooperation with said material for varying the path of said material, movable means responsive to the path of said material, variable inductance means having an air gap, a movable member actuated by said movable means and adapted to move in said air gap to vary the reactance of the variable inductance means, a generator having first and second field windings, means for energizing said first field winding of one polarity, a grid controlled rectifier tube for energizing said second field winding of an opposite polarity to that of the first field winding, a phase shift circuit including said variable inductance means for operating the grid of the tube and vary the output thereof and the field strength of said second field winding, and a motor energized by said generator for driving the mechanism to vary the path of said material, said phase shift circuit producing a greater phase shift in the voltage applied to the grid of the tube than the phase shift of the voltage in the variable inductance means.

4. A control system for regulating the path of moving material, said system comprising mechanism in cooperation with said material for varying the path of said material, movable means responsive to the path of said material, variable inductance means including a magnetic core having an air gap, a movable member actuated by said movable means and adapted to move in said air gap to vary the reactance of the variable inductance means, a dynamoelectric machine having a field winding for driving the mechanism to vary the path of the material, a grid controlled rectifier tube for energizing said field winding, and a phase shift circuit including said variable inductance means for controlling said tube and vary the output thereof and the field strength of said field winding.

5. A control system for regulating the path of moving material, said system comprising mechanism in cooperation with said material for varying the path of said material, movable means responsive to the path of said material, variable inductance means including a magnetic core having an air gap, said air gap being defined by two oppositely disposed spaced surfaces of the magnetic core, a movable member actuated by said movable means and adapted to move in said air gap between said oppositely disposed spaced surfaces of the core to vary the reactance of the variable inductance means, a dynamoelectric machine having a field winding for driving the mechanism to vary the path of the material, a grid controlled rectifier tube for energizing said field winding, and a phase shift circuit including said variable inductance means for controlling said tube and vary the output thereof and the field strength of said field winding.

6. A control system for regulating the path of moving material, said system comprising mechanism in cooperation with said material for varying the path of said material, movable means responsive to the path of said material, variable inductance means including a magnetic core having an air gap, a movable member actuated by said movable means and adapted to move in said air gap to vary the reactance of the variable inductance means, a generator having a field winding, variable means for energizing said field winding, a phase shift circuit including said variable inductance means for controlling said variable means and thus vary the output thereof and the field strength of said field winding, and a motor energized by said generator for driving the mechanism to vary the path of said material.

7. A control system for regulating the path of moving material, said system comprising mechanism in cooperation with said material for varying the path of said material, movable means responsive to the path of said material, variable inductance means including a magnetic core having an air gap, a movable member actuated by said movable means and adapted to move in said air gap to vary the reactance of the variable inductance means, a generator having a field winding, a grid controlled rectifier tube for energizing said field winding, a phase shift circuit including said variable inductance means for controlling said tube and vary the output thereof and the field strength of said field winding, and a motor energized by said generator for driving the mechanism to vary the path of said material.

8. A control system for regulating a variable condition of moving material, said system comprising mechanism in cooperation with said material for varying the said condition, movable means responsive to the variable condition of said material, variable inductance means including a magnetic core having an air gap, said air gap being defined by two oppositely disposed spaced surfaces of the magnetic core, a movable member actuated by said movable means and adapted to move in said air gap between said oppositely disposed spaced surfaces of the core to vary the reactance of the variable inductance means, a generator having a field winding, a grid controlled rectifier tube for energizing said field winding, a phase shift circuit including said variable inductance means for controlling said tube and vary the output thereof and the field strength of said field winding, and a motor energized by said generator for driving the mechanism to vary the condition of said material.

9. A control system for regulating a variable condition of moving material, said system comprising mechanism in cooperation with said material for varying the said condition, movable means responsive to the variable condition of said material, variable inductance means including a magnetic core having an air gap, said air gap being defined by two oppositely disposed spaced surfaces of the magnetic core, a movable member actuated by said movable means and adapted to move in said air gap between said oppositely disposed spaced surfaces of the core to vary the reactance of the variable inductance means, a generator having first and second field windings, means for energizing said first field winding of one polarity, a grid controlled rectifier tube for energizing said second field winding of an opposite polarity to that of the first field winding, said second field winding being energizable to have a stronger field strength than said first field winding, a phase shift circuit including said variable inductance means for controlling said tube and vary the output thereof and the field strength of said second field winding, and a motor energized by said generator for driving the mechanism to vary the condition of said material.

10. A control system for regulating the path of moving material, said system comprising mechanism in cooperation with said material for varying the path of said material, movable means responsive to the path of said material, variable inductance means including a magnetic core having an air gap, said air gap being defined by two oppositely disposed spaced surfaces of the magnetic core, a movable member actuated by said movable means and adapted to move in said air gap between said oppositely disposed spaced surfaces of the core to vary the reactance of the variable inductance means, a generator having first and second field windings, means for energizing said first field winding of one polarity, a grid controlled rectifier tube for energizing said second field winding of an opposite polarity to that of the first field winding, said second field winding being energizable to have a stronger field strength than said first field winding, a phase shift circuit including said variable inductance means for controlling said tube and vary the output thereof and the field strength of said second field winding, and a motor energized by said generator for driving the mechanism to vary the path of said material.

11. A control system for regulating a variable condition of a movable mass, said system comprising mechanism in cooperation with said movable mass for varying the said condition, movable means responsive to the variable condition of said mass, variable inductance means including a magnetic core having an air gap, said air gap being defined by two oppositely disposed spaced surfaces of the magnetic core, a movable member actuated by said movable means and adapted to move in said air gap between said oppositely disposed spaced surfaces of the core to vary the reactance of the variable inductance means, a generator having first and second field windings, means for energizing said first field winding of one polarity, a grid controlled rectifier tube for energizing said second field winding of an opposite polarity to that of the first field winding, said second field winding being energizable to have a stronger field strength than said first field winding, a phase shift circuit including said variable inductance means for controlling said tube and vary the output thereof and the field strength of said second field winding, and a motor energized by said generator for driving the mechanism to vary the condition of said movable mass.

12. A control system for regulating movement of a movable mass, said system comprising mechanism in cooperation with said movable mass for effecting movement of same, movable means responsive to the movement of said movable mass, variable inductance means including a magnetic core having an air gap, a movable member actuated by said movable means and adapted to move in said air gap to vary the reactance of the variable inductance means, a generator having first and second field windings, means for energizing said first field winding of one polarity, a grid controlled rectifier tube for energizing said second field winding of the opposite polarity to that of the first field winding, said second field winding being energizable to have a stronger field strength than said first field winding, a phase shift circuit including said variable inductance means for controlling said tube and vary the output thereof and the field strength of said second field winding, and a motor energized by said generator for driving the mechanism to move said movable mass.

13. A control system for regulating a direct current motor, comprising mechanism driven by said motor, a movable mass movable by said mechanism, movable means responsive to movement of said mass, variable inductance means including a magnetic core having an air gap, a movable member actuated by said movable means and adapted to move in said air gap to vary the reactance of the variable inductance means, a generator having first and second field windings, means for energizing said first field winding of one polarity, a grid controlled rectifier tube for energizing said second field winding of the opposite polarity to that of the first field winding, said second field winding being energizable to have a stronger field strength than said first field winding, a phase shift circuit including said variable inductance means for controlling said tube and vary the output thereof and the field strength of said second field winding, and connections from said motor to said generator.

14. A control system for regulating a reversible motor, comprising mechanism driven by said motor, a movable mass movable by said mechanism, movable means responsive to movement of said mass, variable inductance means, a movable member actuated by said movable means and adapted to vary the impedance of the variable inductance means, a generator having first and second field windings, means for energizing said first field winding of one polarity, a grid controlled rectifier tube for energizing said second field winding of the opposite polarity to that of the first field winding, said second field winding being energizable to have a stronger field strength than said first field winding, a phase shift circuit including said variable inductance means for controlling said tube and vary the output thereof and the field strength of said second field winding, and connections from said motor to generator.

JAY W. PICKING.

References Cited in the file of this patent

UNITED STATES PATENTS

| Number | Name | Date |
|---|---|---|
| 1,930,269 | Greenidge | Oct. 10, 1933 |
| 2,032,176 | Kovalsky | Feb. 25, 1936 |
| 2,075,125 | Mabry et al. | Mar. 30, 1937 |
| 2,078,669 | King | Apr. 27, 1937 |
| 2,311,462 | Neal, Jr. | Feb. 16, 1943 |
| 2,356,567 | Cockrell | Aug. 22, 1944 |
| 2,399,675 | Hays, Jr. | May 7, 1946 |

FOREIGN PATENTS

| Number | Country | Date |
|---|---|---|
| 367,928 | Great Britain | Mar. 3, 1932 |